A. KINGSBURY.
THRUST BEARING.
APPLICATION FILED JAN. 15, 1918.

1,289,048.

Patented Dec. 24, 1918.
2 SHEETS—SHEET 1.

INVENTOR
Albert Kingsbury
BY
Marshall & Dearborn
ATTORNEYS

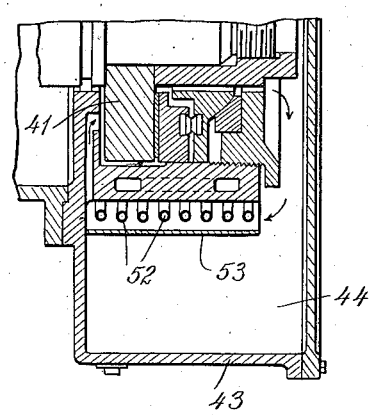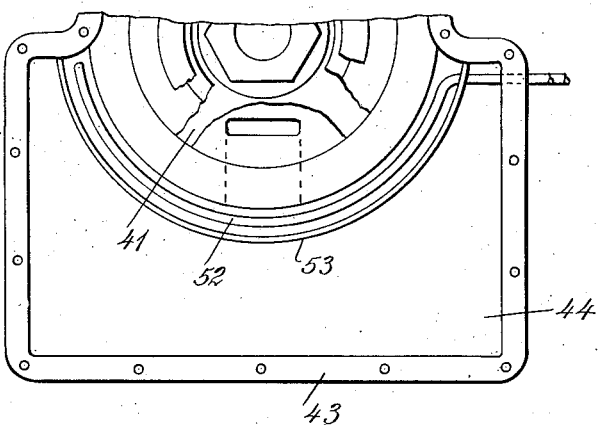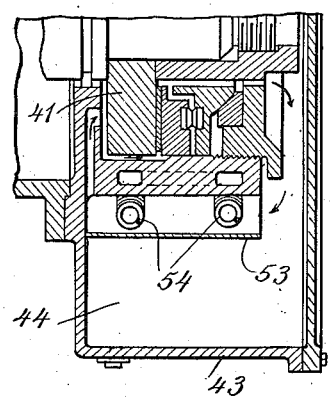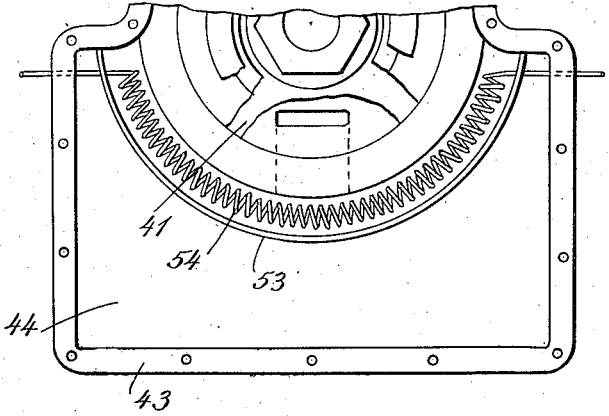

UNITED STATES PATENT OFFICE.

ALBERT KINGSBURY, OF PITTSBURGH, PENNSYLVANIA.

THRUST-BEARING.

1,289,048.  Specification of Letters Patent.  Patented Dec. 24, 1918.

Application filed January 15, 1918. Serial No. 211,906.

*To all whom it may concern:*

Be it known that I, ALBERT KINGSBURY, a citizen of the United States of America, and a resident of Pittsburgh, Allegheny county, and State of Pennsylvania, have invented certain new and useful Improvements in Thrust-Bearings, of which the following is a specification, reference being had to the accompanying drawings, forming a part thereof.

My invention relates to bearings and has special reference to thrust bearings of the pivoted shoe type.

One object of my invention is to provide a bearing of the aforesaid character having a particularly simple and effective means for cooling the oil within the bearing housing so as to avoid the necessity for maintaining the usual lubricating fluid system of circulation from a supply tank to the housing and back, with cooling means outside of the housing.

Another object of my invention is to avoid as far as possible the use of joints or connections within the housing in order to remove the possibility of leakage of water from the cooling coil.

A further object is to provide a cooling coil together with deflecting or diverting means arranged to utilize effectively the swirling or circulation of the oil normally produced in the housing by the action of the rotating parts of the bearing.

In order that my invention may be thoroughly understood I will now proceed to describe the same in the following specification, and will then point out the novel features thereof in appended claims.

Referring to the drawings.

Figure 2:
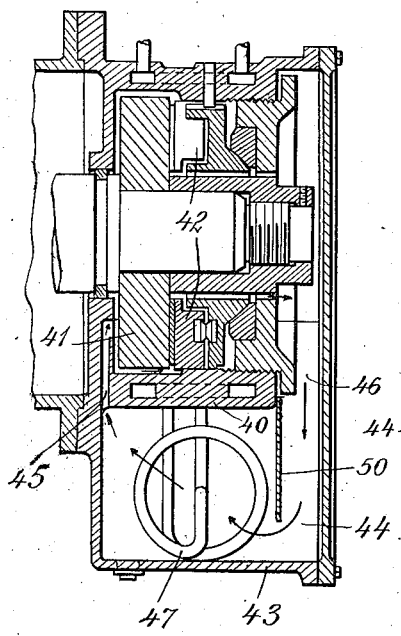
Fig. 2 is a sectional elevation of a horizontal shaft bearing which also constitutes an embodiment of my invention.
Figure 3:
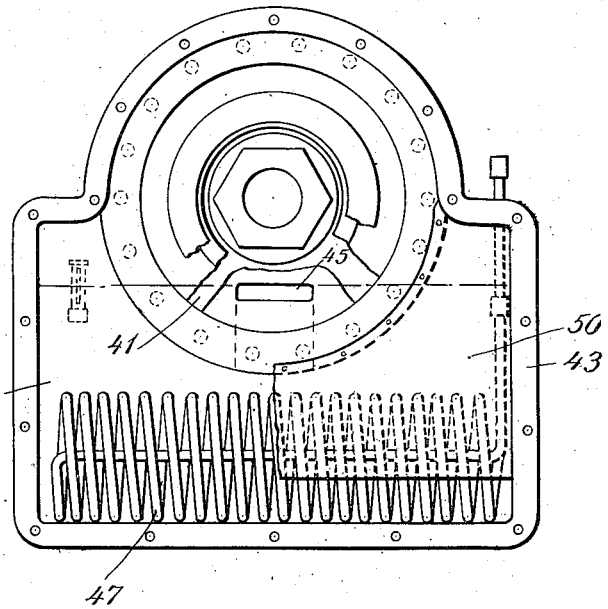
Fig. 3 is an end elevation of the same bearing with certain of the parts, including the housing cover plate, broken away to show the cooling coil and deflector within.

Modified arrangements of cooling coils and deflectors are shown in Figs. 4 and 5, and 6 and 7, which are fragmentary views corresponding in general to Figs. 2 and 3.

Figure 1:
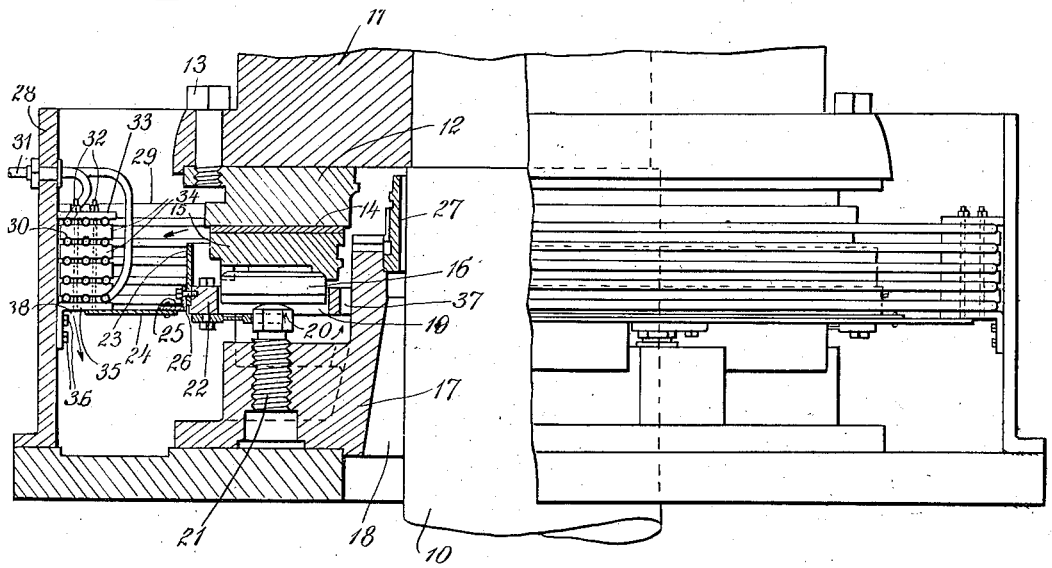
Figure 1 is a sectional elevation of a bearing arranged and constructed in accordance with my invention and embodying the water cooling coil which forms a part thereof.

In Fig. 1, 10 designates a rotatable shaft having an enlargement 11 to which a thrust collar 12 is secured by bolts 13 or other suitable means. Coöperating with the bearing surface 14 of the thrust collar are a plurality of tiltable bearing shoes 15 which are mounted on blocks or carriers 16. The shoes are ultimately supported by a base ring 17 having an opening 18 through which the shaft 10 extends. The blocks 16 are loosely mounted in openings 19 in the base ring and rest on the spherically curved tops 20 of studs 21. The arrangement of parts is such that the studs form adjustable pivots for the shoes and blocks which may be integral if desired.

Mounted on an annular projection 22 of the base ring is a flange or other sleeve 23 and a flat ring 24 which extends radially out from the projection 22. The flat ring is riveted to an angle ring 25 which is affixed together with the sleeve 23, to the projection 22 by bolts 26.

The base ring 17 is further provided adjacent to the shaft, with a sleeve 27 which, in conjunction with an outer wall or casing 28 of the housing, provides an annular oil chamber in which the preferred oil level is indicated at 29.

A cooling coil 30 is disposed within the housing wall 28 and just above the plate or disk 24. The coil is preferably composed of a large number of turns of continuous pipe, the ends 31 of which are carried through the housing wall one constituting a water inlet and the other a water outlet.

The various turns of the coil are held in position by bolts 32 which extend through clamping plates 33 and spacing blocks 34 and are screwed into angle brackets 35. The brackets are affixed to the housing wall 28 by bolts 36. The base ring 17 is provided with oil passages 37 and the upper body of oil which is above the deflector plate 24 is caused to swirl or rotate by reason of the rotation of the thrust collar 12. The centrifugal action causes the oil to move outwardly from the bearing and consequently it comes directly under the influence of the cooling coil 30 after it leaves the bearing surfaces. The oil, when cool, falls downwardly beyond the deflector plate 24 through passages 38 between the brackets 35. As the oil moves outwardly in the upper chamber more oil arises from the lower chamber through the passages 37. Thus there is circulation of cool oil from the lower chamber upwardly from the passages 37 outwardly between the bearing surfaces and between the bearing shoes through the cooling coil and back into the lower chamber.

My invention is not only applicable to a vertical shaft bearing as shown in Fig. 1, but is also adapted to be utilized with a horizontal bearing such as that shown in Figs. 2 to 7 inclusive.

In these structures the housing has the form of a drum or hollow cylinder 40 in which the thrust collar 41 and bearing shoes 42 and their supports are disposed. The housing is enlarged by an outer wall 43 at the bottom forming an oil chamber 44. An oil passage 45 is provided from the chamber 44 to the space within the drum at one end and there is a relatively large passage 46 at the opposite end.

In the arrangement of Figs. 2 and 3 a straight helical cooling coil 47 is disposed in the bottom of the oil chamber 44 and a deflector plate 50 is secured to the drum 40 from which it extends downward adjacent to the cooling coil and close to the bottom of the chamber. It is clearly adapted to cause the circulating fluid to pass between and around the turns of the coil. The oil circulates in the direction indicated by the arrows and while it flows between the bearing shoes in a radially inward direction in accordance with the principles set forth in my Patent 1,201,057, it is dependent upon the movement of the rotating parts of the bearing as well as the circulation which is established with the arrangement of Fig. 1.

The cooling coil may be made flat and mounted close to the housing drum 40 as shown at 52 in Figs. 4 and 5. A curved deflector plate 53 is preferably mounted close to the coil and below it in such manner that the oil flows through a relatively thin cooling passage in which the coil 52 is disposed.

As shown in Figs. 6 and 7, one or more helical coils 54 may be substituted for the coil 52.

Devices of preferred forms and construction have been illustrated and described for the purpose of showing how this invention may be used. But these are merely illustrative embodiments of the invention and I intend no limitations other than those imposed by the appended claims.

What I claim is:

1. In a thrust bearing, the combination of a rotatable shaft having a collar, an oil containing reservoir into which the collar extends, a cooling coil in the reservoir, and means for deflecting the oil so as to cause it to flow around the cooling coil.

2. A thrust bearing comprising a vertical shaft having a thrust collar, an annular oil reservoir in which the collar is disposed, a plurality of tiltable bearing shoes coöperating with the thrust surface of the collar, and a coil of pipe in the reservoir around the collar and radially opposite the bearing surface thereof.

3. A thrust bearing comprising a vertical shaft having a thrust collar, an annular oil reservoir in which the collar is disposed, a plurality of tiltable bearing shoes coöperating with the thrust surface of the collar, a coil of pipe in the reservoir around the collar and radially opposite the bearing surface thereof, and means for deflecting the oil to cause it to flow around the cooling coil.

4. A thrust bearing comprising a vertical shaft having a thrust collar, an annular oil reservoir in which the collar is disposed, a plurality of tiltable bearing shoes coöperating with the thrust surface of the collar, a coil of pipe in the reservoir around the collar and radially opposite the bearing surface thereof, and a deflector for directing the oil around the coil.

5. A thrust bearing comprising a vertical shaft having a thrust collar, an annular oil reservoir in which the collar is disposed, a plurality of tiltable bearing shoes coöperating with the thrust surface of the collar, a coil of pipe in the reservoir around the collar and radially opposite the bearing surface thereof, and an annular deflecting plate extending radially outward from the shoes to the coil.

6. A thrust bearing comprising a vertical shaft, an annular channel-shaped oil reservoir, a thrust collar on the shaft extending axially within the oil reservoir and having a thrust surface immersed in the oil therein, tiltable bearing shoes mounted within the reservoir and coöperating with the thrust surface, and means for directing the circulation of oil from the thrust surface around the coil.

7. A thrust bearing comprising a vertical shaft, an annular channel-shaped oil reservoir, a thrust collar on the shaft extending axially within the oil reservoir and having a thrust surface immersed in the oil therein, tiltable bearing shoes mounted within the reservoir and coöperating with the thrust surface, and means for directing the circulation of oil from the thrust surface around the coil, radially inward near the bottom of the reservoir and axially upward near the shaft.

8. In a thrust bearing, the combination of rotatable bearing members, an oil containing reservoir into which the members extend, cooling means in the reservoir, and means arranged to coöperate with and dependent upon the centrifugal action of the rotatable bearing members for deflecting the oil so as to cause it to flow around the cooling means.

In witness whereof, I have hereunto set my hand this 11 day of January, 1918.

ALBERT KINGSBURY.